United States Patent [19]

Boos et al.

[11] Patent Number: 4,575,047

[45] Date of Patent: Mar. 11, 1986

[54] CERAMIC TO METAL JUNCTION AND METHOD OF MAKING SAME

[75] Inventors: Charles J. Boos, Lewiston; Mario C. Kerr, East Amherst, both of N.Y.

[73] Assignee: Kennecott Corporation, Cleveland, Ohio

[21] Appl. No.: 573,278

[22] Filed: Jan. 24, 1984

[51] Int. Cl.[4] .............................................. F16K 17/38
[52] U.S. Cl. .................... 251/356; 137/468; 403/30; 403/268; 403/299; 403/404
[58] Field of Search ................ 137/468; 251/356, 319; 403/30, 268, 299, 343, 404

[56] References Cited

U.S. PATENT DOCUMENTS

| Re. 25,625 | 7/1964 | Been et al. | 161/186 |
|---|---|---|---|
| 3,352,533 | 11/1967 | Murton | 251/356 |
| 3,352,534 | 11/1967 | Harley | 251/356 |
| 3,379,210 | 4/1968 | Wheeler | 251/357 |
| 3,554,490 | 1/1971 | Cahoon, Jr. | 251/356 |
| 3,674,586 | 7/1972 | Rimkus | 156/196 |
| 3,892,383 | 7/1975 | Hesse | 251/357 |
| 4,063,582 | 12/1977 | Fischer | 264/328 |
| 4,337,920 | 7/1982 | Parris | 251/319 |

*Primary Examiner*—A. Michael Chambers
*Attorney, Agent, or Firm*—David M. Ronyak

[57] ABSTRACT

A ceramic part having one of a boss projecting therefrom or a bore therein is joined to a metal part having a complementary boss or bore. The ceramic and metallic parts overlap one another such that the boss is within the bore when assembled. A metallic insert is bonded to the ceramic part and secured by threads to the metallic part in the overlapping area. Metallic part and metallic insert are dimensioned such that when the joint is fully assembled an end of the insert bears on the metallic part and the ceramic and metallic parts do not contact one another.

14 Claims, 2 Drawing Figures

CERAMIC TO METAL JUNCTION AND METHOD OF MAKING SAME

This application relates to a ceramic to metal junction and to a method of making same. More particularly it relates to such a junction in which a metallic insert is first secured to the ceramic part, the metallic junction being provided with threads adapted to engage complimentary threads of the metallic part. The joint can be readily assembled and disassembled. Even more particularly the invention relates to a needle valve having a replacable ceramic tip that is readily detachable from its metallic stem.

BACKGROUND OF THE INVENTION

Difficulty has long been encountered in joining ceramic parts to those formed of metal due to their consideraby differing physical properties. Forming threads directly in ceramic material has not been deemed suitable due to the brittle nature of ceramics and their tendancy to rapidly propagate any surface flaw resulting in complete failure of the part or junction. Attempts to braze or weld or solder ceramic parts have enjoyed some success. However, the difficulty of successfully making such a junction rapidly increases as the size of the parts to be joined increases due to differing thermal expansion rates for the ceramic and metallic members and the need for application of sufficient heat to form a joint. Generally, this method has only been successfuly when relatively small members are joined to one another, for example, (refer to turbocharger program).

An example of a known method for producing metal to ceramic junctions is disclosed in U.S. Pat. No. 3,674,586 to Rimkus. This known method includes the steps of depositing an adhesive layer on a ceramic body on a surface portion thereof where the junction is to be made, and deforming the metal against the body at the location of the surface portion at a relatively high speed and with relatively strong force. The metal may be deformed by using hydrospark, explosive forming and magnetic forming operations.

It is also well known that chemical adhesives particularly expoxies may be employed to join rigid materials such as metal or glass to one another. Suitable structural adhesive compositions for this purpose are disclosed in U.S. Pat. No. 2,920,990 to Been et al and its Re-issue U.S. Pat. No. Re. 25,625.

U.S. Pat. No. 4,063,582 discloses an arrangement for and method of anchoring a sleeve-shaped mounting element in masonry by injection of a binding materials between the sleeve shaped element and the hole in the masonery. The mounting element includes on its outer periphery a series of ribs that are circumferentially spaced from one another which center the mounting element in the hole and establish passages for the binding material which fills the circumferential recess between the masonery hole and the mounting element.

SUMMARY OF THE INVENTION

According to an aspect of the present invention there is provided a ceramic to metal junction comprising (a) a ceramic part having one of a boss projecting therefrom or a bore therein;

(b) a metallic part hasvng one of a boss projecting therefrom or a bore therein of a size and shape complementary to that of the ceramic part, one of the ceramic and metallic parts overlapping the other such that the obss is within the bore;

(c) a metallic insert having inner and outer peripheral surfaces, anterior and posterior ends, the insert being adhesively secured by one of said inner and outer surfaces to the ceramic part in the overlapping area and being secured by threads to the metallic part in the overlapping area;

(d) the ceramic part, metallic part and metallic insert being dimensioned such that the posterior end of the insert engages the metallic part and the metallic part does not contact the ceramic part.

According to another aspect of the present invention there is provided a method of forming a ceramic-to-metal junction, the method comprising:

(a) providing a ceramic part having one of a boss projecting therefrom or a bore therein;

(b) providing a metallic part having one of a boss projecting therefrom or a bore therein of a size and shape complementary to that of the ceramic part;

(c) providing a metallic insert having inner and outer peripheral surfaces, an anterior end and a posterior end;

(d) bonding the metallic insert by one of said peripheral surfaces to the boss or bore of the ceramic part, the posterior end of the insert projecting beyond the ceramic part;

(e) providing threads on the other peripheral surface of the metallic insert and providing complementary threads on the complementary boss or bore of the metallic part; and (f) joining the ceramic part to the metallic part by twisting them together until the posterior end of the insert contacts the metallic part.

The junction of the present invention and its method result in a junction which may be readily disassembled and reassembled repeatedly without damage to the ceramic part.

The invention may be better understood from the following description of specific embodiments when read in connection with the accompanying drawing.

DESCRIPTION OF THE PREFERRED EMBODIMENT

Figure 1:
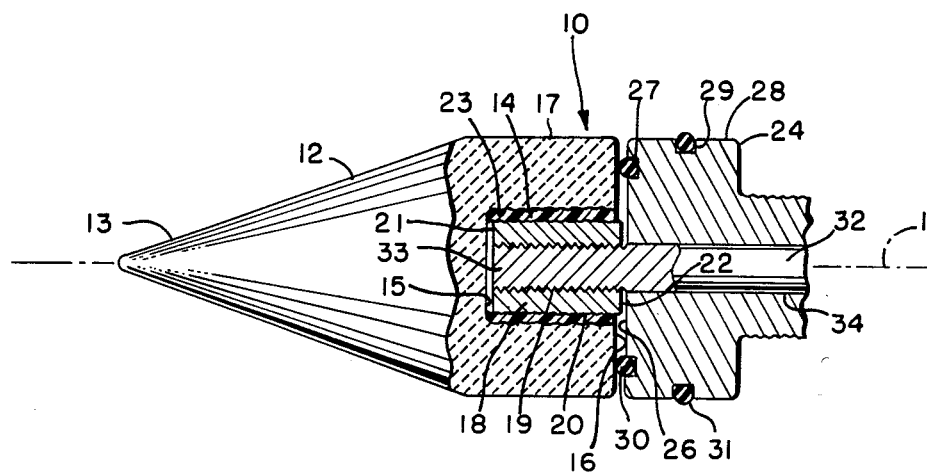
FIG. 1 is a fragmentary side view partially in section of a needle valve stem and tip depicting a preferred embodiment of a junction according to the present invention.

Referring now to FIG. 1 of the drawing, there is shown a needle valve tip/stem assembly 10 which exibits radial symmetry about longitudinal access 11. Assembly 10 includes ceramic tip 12 which has a conical sealing surface 13 at its anterior end and a recess or bore 14 centrally located in its base 16. Base 16 is of generally cylindrical configuration and bore 14 is coaxially positioned. A metallic insert 18 is bonded to the walls of bore 14 by a chemical adhesive such as an epoxy.

The insert 18 includes an anterior end 21 which is disposed in a direction towards the conical sealing surface of the ceramic tip and is thus adjacent the bottom of 15 of bore 14. Insert 18 has a posterior end 22 which projects beyond the base 16 of the ceramic tip 12. The outer peripheral surface of the insert 18 is preferably roughened or textured for example by knurling, threading, or sandblasting and thoroughly cleaned prior to formation of the adhesive joint to assure good bonding with chemical adhesive 23. The sides or walls of recess or bore 14 are preferably prepared in similar fashion.

Valve stem 24 is formed of metal. The front 26 of valve stem 24 is generally of a configuration which corresponds to that of the base 16 of tip 12. As shown in FIG. 1 of the drawing, each is generally flat. Valve stem 24 includes a coaxial threaded boss 32 adapted to threadably engage metal insert 18. The length of boss 32 is such that when the ceramic part and metallic part are assembled, the boss 32 does not contact the bottom 15 of recess 14 in ceramic tip 12 and thereby does not directly exert any stress on the ceramic tip 12. While the boss 32 is depicted in FIG. 1 as being a separate element, it may be integrally formed with valve stem 24 or whatever metallic part is intended to be joined to the ceramic part.

The valve stem 24 in preferred embodiments further includes a circumferential groove 27 on the front 26 of valve stem 24 and an appropriately dimensioned elastomeric o-ring is inserted into groove 27 prior to assembly of the ceramic tip (having adhesively secured thereto the metal insert) to the metal valve stem upon twisting together of the ceramic tip 12 (having insert 18 adhesively secured thereto) and metal valve stem 24 O-ring 30 is compressed. Compressed O-ring 30 forms a seal between the base 16 of tip 12 and the front 27 of valve stem 26 thereby preventing ingress of potentially corrosive fluids and other foreign material. O-ring 30 also serves to dampen vibrations which could result in early failure of ceramic tip 12.

Figure 2:
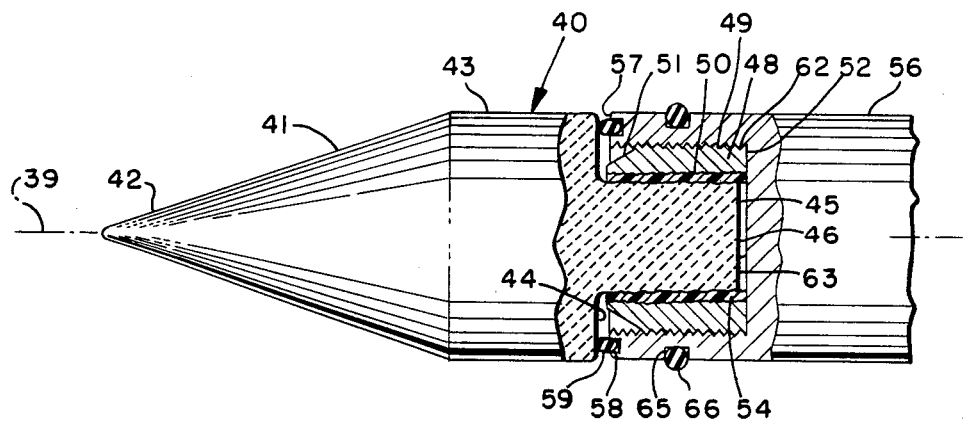
FIG. 2 is a side view partially in section of an alternate embodiment incorporating the invention.

Refering now to FIG. 2 there is shown an alternate embodiment of a ceramic needle valve tip/stem assembly 40 which is radially symmetric about longitudinal axis 39. Assembly 40 includes ceramic tip 41 which includes a conical sealing surface 42 at its front end joined to a cylindrical portion 43. The rear surface 44 of tip 41 has a boss 45 projecting therefrom. Boss 45 is coaxial with cylindrical portion 43 and is integrally formed with the remainder of ceramic tip 41 prior to firing of the ceramic material.

The junction of FIG. 2 includes a metallic insert 48 disposed between ceramic boss 45 and the axially overlapping metallic stem 56. As in FIG. 1, metallic insert 48 includes interior and exterior peripheral surfaces 50 and 49 respectively, and anterior end 51 which is disposed toward the conical sealing surface 42 of ceramic tip 41 and a posterior end 52 which projects beyond the end 46 of boss 45 a slight amount. The inner peripheral surface 50 of insert 48 is preferably roughened in a manner corresponding to that described with respect to the outer peripheral surface 20 of insert 18 of FIG. 1. The outer peripheral surface 49 of insert 48 is threaded. Insert 48 tapers in thickness toward its anterior end 51. Although this feature is illustrated in FIG. 2, the drawing does not show that the taper should be carried down to a feather edge to reduce the possibility of causing a high stress in the ceramic part at the anterior end of the metallic insert 48. Insert 48 is secured to boss 45 by an adhesive.

In FIG. 2 valve stem 56 includes a flat forward end 57 which includes a circumferential groove 58. The flat end 57 of stem 56 includes a coaxial bore 62 which is internally threaded in a manner complementary to the threads formed on the outer surface 49 of metal insert 48. The bottom 63 of bore 62 complements the configuration of the posterior end 52 of insert 48 such that the posterior end 52 of metallic insert 48 contacts the bottom 63 of bore 62 when assembled.

An O-ring 59 is provided in circumferential groove 58. O-ring 59 is compressed between the rear surface 44 of tip 41 and the front 57 of valve stem 52 upon assembly of the ceramic tip (having adhesively secured thereto insert 48) to metal stem 52 by twisting them together until the posterior end 52 of insert 48 bears on the bottom 63 of bore 62. As stated with respect to FIG. 1 O-ring 59 serves to seal the junction and to dampen vibrations which could lessen its service life.

In each of FIGS. 1 and 2 there is shown an additional circumferential groove 28, 65 respectively which is provided with an elastomeric O-ring 29, 66 respectively which locates the needle valve tip/stem assembly 10, 40 respectively within the bore of the valve for which it is adapted (not shown).

In each of the two embodiments shown, the ceramic-to-metal junction may be formed by providing a ceramic part having either a boss projecting therefrom or a bore formed therein. To insure highest integrity of the ceramic part, the boss or bore should be formed integrally with the part as a green part prior to firing the ceramic part to its finished state. A metallic part is provided which has either a boss projecting therefrom or a bore therein of a size and shape that is complementary to that of the ceramic part to which it is to be joined. Sufficient difference in diameter exists between the boss and bore so that a metallic insert may be bonded to the ceramic part. In the case of a chemical adhesive such as an epoxy, the surfaces to be bonded are preferably textured and are cleaned prior to application of the adhesive. The adhesive may be applied to the metallic insert prior to it being positioned relative to the ceramic part or the adhesive may be first applied to the ceramic part or the adhesive may be forced into the space between the prepositioned ceramic part and metallic insert. The surface of the metallic insert that is not adhesively secured to the ceramic part is provided with threads. A complementary threaded bore or boss is provided on the metallic part. After the metallic insert is bonded to the ceramic part, the ceramic part may be joined to the metallic part by simply twisting them together. These parts are twisted together until the posterior end of the metallic insert contacts the metallic part.

In the completed junction, stresses are transferred from the ceramic part to the metallic part firstly through the bonding layer and secondly through the metallic insert. There is no direct contact of the ceramic part with the metal part. When a sealed junction is formed by incorporation of an elastomeric O-ring between the ceramic part and the metallic part of the load is also transferred between these parts through the O-ring which serves to dampen any vibrations which might otherwise reduce the service life of the ceramic part or the junction.

While the prefered embodiments have been described which have a metallic insert which is bonded to the ceramic part through use of a chemical adhesive, specifically an epoxy resin adhesive, it is within contemplation of the invention to utilize other bonding means to secure the metallic insert to the ceramic part such as other types of organic adhesives, inorganic adhesives, and soldering, welding or brazing. These latter techniques may in some instances be employed successfully to join a ceramic part to a rather large metallic part because the amount of heat needed to solder, weld or braze is greatly reduced and the time at elevated temperature is greatly reduced due to the relatively small thickness of the metallic insert which facilitates rapid heatup and cooldown. Soldering, welding and brazing techniques are preferably utilized in conjunction with the embodiment shown in FIG. 2 whereas the embodiment shown in FIG. 1 is preferred for use with chemically setting adhesives.

While certain representative embodiments and details have been shown for the purpose of illustrating the invention, it will be apparant to those skilled in the art that various changes and modifications may be made therein without departing from the spirit or scope of the invention.

What is claimed is:

1. A ceramic-to-metal junction comprising:
   (a) a ceramic part having a boss projecting therefrom;
   (b) a metallic part having a bore therein of a size and shape complementary to that of the boss of the ceramic part, the metallic part overlapping the ceramic part such that the boss is within the bore;
   (c) a metallic insert having inner and outer peripheral surfaces, anterior and posterior ends, the insert being bonded by said inner surface to the boss of the ceramic part in the overlapping area and being secured by threads to the metallic part in the overlapping area:
   (d) the ceramic part, metallic part and metallic insert being dimensioned such that the posterior end of the insert engages the metallic part and the metallic part does not contact the ceramic part when assembled.

2. The junction of claim 1 wherein the ceramic part has a base having said integally formed boss projecting therefrom to the outer peripheral surface of which is bonded the inner peripheral surface of an externally threaded metallic insert whose posterior end projects in the direction of the bore beyond the end of the boss.

3. The junction of claim 2 wherein the metallic part includes a threaded bore adapted to threadably engage the metallic insert, the bore being of such depth that the metallic part does not contact the ceramic part when assembled and the posterior end of the metallic insert contacts the bottom of the bore when assembled.

4. The junction of claim 3 wherein the anterior end of the metallic insert projects toward the base of the ceramic part, said metallic insert tapering in thickness toward its anterior end.

5. The junction of claim 3 wherein the boss and bore are generally of cylindrical configuration.

6. The junction of claim 3, wherein a ring-shaped elastomeric sealing member circumscribes the outer peripheral surface of the metallic insert, the sealing member being compressed between the metallic part and the base of the ceramic part.

7. The junction of claim 6 wherein the ceramic part is in the shape of a conical needle valve tip and the metallic part is in the shape of a needle valve stem.

8. A needle valve stem having a readibly replaceable ceramic tip comprising:
   (a) a ceramic part in the configuration of a conical needle valve tip, the ceramic part having a base having a bore therein;
   (b) a metallic part in the configuration of a complementary needle valve stem, the metallic part having a threaded boss projecting therefrom;
   (c) a metallic insert having inner and outer peripheral surfaces, anterior and posterior ends, the insert being bonded by its outer peripheral surface to the walls of the bore, the inner peripheral surface of the insert adapted to be threadably engageable with the boss of the metallic part;
   (d) the ceramic part, the metallic part and metallic insert being dimensioned such that when assembled by twisting the posterior end of the insert engages the metallic part and the metallic part does not contact the ceramic;
   (e) the metallic part further including a circumferential groove having an elastomeric ring-shaped member which circumscribes the outer peripheral surface of the metallic insert upon assembly, the elastomeric member being compressed between the metallic part and the base of the ceramic part upon assembly.

9. A ceramic-to-metal junction comprising:
   (a) a ceramic part having a bore therein;
   (b) a metallic part having a boss projecting therefrom of a size and shape complementary to that of the bore of the ceramic part, the ceramic part overlapping the metallic part such that the boss is within the bore:
   (c) a metallic insert having inner and outer peripheral surfaces, anterior and posterior ends, the insert being bonded by said outer surface to the ceramic part in the overlapping area and being secured by threads to the metallic part in the overlapping area:
   (d) the ceramic part, metallic part and metallic insert being dimensioned such that the posterior end of the insert engages the metallic part and the metallic part does not contact the ceramic part when assembled.

10. The junction of claim 9 wherein the ceramic part has a base that includes a bore therein to which is adhesively secured the outer peripheral surface of an internally threaded metallic insert whose posterior end projects in the direction of the bore slightly beyond the base of the ceramic part.

11. The junction of claim 10 wherein the metal part includes a threaded boss adapted to threadably engage the metal insert, the length of the boss being such that it does not contact the ceramic part when assembled.

12. The junction of claim 10 wherein a ring-shaped elastomeric member circumscribes in spaced relationship the outer peripheral surface of the metallic insert, the elastomeric member being compressed between the metallic part and the base of the ceramic part.

13. The junction of claim 12 wherein the ceramic part is in the shape of a conical needle valve tip and the metal part is in the shape of a needle valve stem.

14. The junction of claim 11 wherein the boss and bore are generally of cylindrical configuration.

* * * * *